US008090083B2

(12) United States Patent
Fong et al.

(10) Patent No.: US 8,090,083 B2
(45) Date of Patent: *Jan. 3, 2012

(54) UNIFIED MESSAGING ARCHITECTURE

(75) Inventors: David T. Fong, Kirkland, WA (US);
David A. Howell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 216 days.

This patent is subject to a terminal disclaimer.

(21) Appl. No.: 12/472,137

(22) Filed: May 26, 2009

(65) Prior Publication Data

US 2009/0290692 A1 Nov. 26, 2009

Related U.S. Application Data

(63) Continuation of application No. 11/087,007, filed on Mar. 22, 2005, now Pat. No. 7,551,727.

(60) Provisional application No. 60/620,826, filed on Oct. 20, 2004.

(51) Int. Cl.
*H04M 11/00* (2006.01)

(52) U.S. Cl. .............................. 379/88.14; 379/100.13

(58) Field of Classification Search .... 379/88.13–88.14, 379/100.13
See application file for complete search history.

(56) References Cited

U.S. PATENT DOCUMENTS

| 5,003,575 | A | 3/1991 | Chamberlin et al. | |
|---|---|---|---|---|
| 5,557,659 | A | 9/1996 | Hyde-Thomson | |
| 5,647,002 | A | 7/1997 | Brunson | |
| 5,674,002 | A | 10/1997 | Powell et al. | 703/1 |
| 5,802,526 | A | 9/1998 | Fawcett et al. | |
| 5,915,001 | A | 6/1999 | Uppaluru | |
| 6,058,415 | A | 5/2000 | Polcyn | 709/200 |
| 6,061,433 | A | 5/2000 | Polcyn et al. | |
| 6,064,723 | A | 5/2000 | Cohn et al. | 379/88.14 |
| 6,072,862 | A | 6/2000 | Srinivasan | 379/100.08 |
| 6,088,428 | A | 7/2000 | Trandal et al. | |
| 6,101,473 | A | 8/2000 | Scott et al. | |
| 6,104,788 | A | 8/2000 | Shaffer et al. | 379/93.17 |
| 6,173,043 | B1 | 1/2001 | Finnigan | 379/88.18 |
| 6,411,685 | B1 | 6/2002 | O'Neal | |

(Continued)

FOREIGN PATENT DOCUMENTS

CN 1798210 A 7/2006

(Continued)

OTHER PUBLICATIONS

Chinese Second Office Action dated Jan. 19, 2011 cited in Application No. 200610009316.2.

(Continued)

*Primary Examiner* — Simon Sing
(74) *Attorney, Agent, or Firm* — Merchant & Gould

(57) ABSTRACT

A system and/or methodology that unifies a telephonic communication component and/or system with a data (e.g., messaging) server component and/or system. The system can facilitate telephonically accessing rich information in the server (e.g., messaging server). This rich information can include email content, calendar content, contacts information, or the like. Moreover, with access to an application programming interface, the invention can add functionality to initiate email communications as well as to accept or cancel meetings. Furthermore, the invention can synchronize messages of disparate formats. By way of example a user can set an "Out of Office" (OOF) status on both an email systems and telephone voicemail system from one location in one action. In another aspect, it will be appreciated that any message or data component can be analyzed, transformed, matched and/ or communicated from one system to another (e.g., server to telephone) in accordance with the subject invention.

20 Claims, 17 Drawing Sheets

U.S. PATENT DOCUMENTS

| | | |
|---|---|---|
| 6,522,726 B1 | 2/2003 | Hunt et al. |
| 6,640,242 B1 | 10/2003 | O'Neal et al. |
| 6,651,042 B1 | 11/2003 | Field et al. |
| 6,697,458 B1 | 2/2004 | Kunjibettu |
| 6,704,394 B1 | 3/2004 | Kambhatla et al. |
| 6,738,462 B1 | 5/2004 | Brunson |
| 6,778,644 B1 | 8/2004 | Jenkins et al. |
| 6,795,536 B1 | 9/2004 | Ronca ........................ 379/88.25 |
| 6,801,763 B2 | 10/2004 | Elsey et al. |
| 6,920,425 B1 | 7/2005 | Will et al. |
| 6,981,023 B1 | 12/2005 | Hamilton et al. |
| 6,987,840 B1 | 1/2006 | Bosik et al. |
| 7,054,939 B2 | 5/2006 | Koch et al. |
| 7,068,643 B1 | 6/2006 | Hammond |
| 7,080,315 B1 | 7/2006 | Lucas et al. |
| 7,120,234 B1 | 10/2006 | Quinn et al. |
| 7,136,478 B1 | 11/2006 | Brand et al. |
| 7,149,777 B1 | 12/2006 | Rhee |
| 7,283,808 B2 | 10/2007 | Castell et al. |
| 7,289,606 B2 | 10/2007 | Sibal et al. |
| 7,315,613 B2 | 1/2008 | Kleindienst et al. |
| 7,356,130 B2 | 4/2008 | Agapi et al. |
| 7,551,727 B2 | 6/2009 | Howell et al. ............. 379/88.14 |
| 7,912,186 B2 | 3/2011 | Howell et al. |
| 2001/0015972 A1 | 8/2001 | Horiguchi et al. |
| 2001/0041590 A1 | 11/2001 | Silberfenig et al. |
| 2002/0055350 A1 | 5/2002 | Gupte et al. |
| 2002/0077829 A1 | 6/2002 | Brennan et al. |
| 2002/0082030 A1 | 6/2002 | Berndt et al. ................ 455/466 |
| 2002/0109731 A1 | 8/2002 | Longobardi |
| 2003/0046346 A1 | 3/2003 | Mumick et al. |
| 2003/0046401 A1 | 3/2003 | Abbott et al. |
| 2003/0059000 A1 | 3/2003 | Burton et al. |
| 2003/0162561 A1 | 8/2003 | Johnson et al. |
| 2003/0182622 A1 | 9/2003 | Sibal et al. |
| 2003/0195937 A1 | 10/2003 | Kircher et al. |
| 2003/0235282 A1 | 12/2003 | Sichelman et al. |
| 2004/0141594 A1 | 7/2004 | Brunson et al. |
| 2004/0148356 A1 | 7/2004 | Bishop et al. |
| 2004/0156484 A1 | 8/2004 | Amin ........................ 379/88.14 |
| 2005/0054381 A1 | 3/2005 | Lee et al. |
| 2006/0083357 A1 | 4/2006 | Howell et al. |
| 2006/0083358 A1 | 4/2006 | Fong et al. |
| 2011/0216889 A1 | 9/2011 | Howell et al. |

FOREIGN PATENT DOCUMENTS

| | | |
|---|---|---|
| EP | 1 111 891 A | 6/2001 |
| JP | 09-093414 | 4/1997 |
| JP | 11-088502 | 3/1999 |
| JP | 2000-278388 | 10/2000 |
| JP | 2001-292240 | 10/2001 |
| JP | 2002-259305 | 9/2002 |
| JP | 2002-269214 | 9/2002 |
| JP | 2004-260416 | 9/2004 |
| WO | WO 0018100 | 3/2000 |
| WO | WO 00/27099 A | 5/2000 |
| WO | WO 00/54488 | 9/2000 |
| WO | WO 02077854 | 10/2002 |
| WO | WO 2004/042699 A1 | 5/2004 |

OTHER PUBLICATIONS

U.S. Appl. No. 13/044,581, filed Mar. 10, 2011 entitled "Selectable State Machine User Interface System".

European Office Action dated Mar. 2, 2011 cited in Application No. 05 109 098.3.

M.G. Brown et al., "Open-Vocabulary Speech Indexing for Voice and Video Mail Retrieval," XP-000734729, Publication Date: Nov. 18, 1996, pp. 307-316.

Chinese Third Office Action dated Mar. 30, 2011 cited in Application No. 200610009316.2.

European Search Report dated Jan. 31, 2006 mailed Feb. 1, 2006 for PCT Application No. EP 05 10 9098 (8 pgs.).

U.S. Office Action dated Apr. 10, 2008 cited in U.S. Appl. No. 11/087,007.

U.S. Final Office Action dated Dec. 10, 2008 cited in U.S. Appl. No. 11/087,007.

Chinese First Office Action dated Oct. 9, 2009 cited in Application No. 200610009316.2.

European Search Report dated Jun. 13, 2006 cited in Application No. 06 111 468, 3 pgs.

European Communication dated Nov. 15, 2006 cited in Application No. 05 10 9098.3.

European Communication dated May 11, 2007 cited in Application No. 06 111 468.2.

European Communication dated Nov. 11, 2008 cited in Application No. 06 111 468.2.

European Office Action dated Jun. 23, 2010 cited in Application No. 06 111 468.2.

U.S. Office Action dated Oct. 21, 2008 cited in U.S. Appl. No. 11/086,828.

U.S. Final Office Action dated Apr. 27, 2009 cited in U.S. Appl. No. 11/086,828.

U.S. Office Action dated Oct. 30, 2009 cited in U.S. Appl. No. 11/086,828.

U.S. Final Office Action dated Apr. 6, 2010 cited in U.S. Appl. No. 11/086,828.

Japanese Notice of Rejection dated Aug. 24, 2010 cited in Application No. 2005-272278.

Chinese First Office Action dated Oct. 30, 2009 cited in Application No. 200510106407.3.

Korean Notice of Preliminary Rejection dated Jun. 23, 2011 cited in Application No. 10-2005-84096.

Japanese Final Notice of Rejection dated May 31, 2011 cited in Application No. 2005-272278.

Japanese Notice of Rejection dated Nov. 4, 2011 cited in Application No. 2006-034135, 6 pgs.

UNIFIED MESSAGING ARCHITECTURE

RELATED APPLICATIONS

This application is a Continuation of co-pending U.S. application Ser. No. 11/087,007 entitled "Unified Messaging Architecture" filed Mar. 22, 2005, which is incorporated herein by reference. Under provisions of 35 U.S.C. §119(e), Applicants claim the benefit of U.S. Provisional Application No. 60/620,826 filed Oct. 20, 2004, which is also incorporated herein by reference.

TECHNICAL FIELD

This invention is related to messaging systems, and more particularly to a unified messaging system that can facilitate telephonic access to rich data information maintained in a server to enhance functionality and streamline operation.

BACKGROUND OF THE INVENTION

With the technological advances in telephonic communication devices (e.g., smart phones), there is an ongoing and increasing need to maximize the benefit of these continually emerging technologies by unifying them with rich data-based communication and organization systems. Specifically, there is a need to leverage the flexibility and performance of these telephonic communication devices with respect to existing applications and systems (e.g., email, calendar organizers and fax servers). Additionally, a need exists to develop unified systems and/or methodologies that employ voice recognition and conversion techniques thus integrating and/or unifying these communication systems.

Today, the popularity and functionality of the exchange of information via mobile communications devices is rapidly increasing. For example, text messaging (e.g., instant messaging) and wireless Internet access via portable communication devices have become commonplace. Virtually all sectors of today's society rely upon these methods of communication.

With respect to two-way communication, telephone systems and functionality are virtually isolated from computer programs and servers. For example, a user voicemail account does not seamlessly interact with an email account or vice-versa. In a specific scenario, when an employee of a company leaves the office for an extended period of time, an "out-of-office" (OOF) message is frequently recorded on the employee outgoing voice message service to alert callers of the absence. Because of the lack of compatibility and synchronization functionality, the employee frequently configures a separate OOF email message to alert persons attempting to contact the employee via email of the absence.

Conventionally, unified messaging systems and/or methodologies do not exist to enable a user to functionally interact with one system via the other system. Therefore, a substantial need exists to combine, unify and/or integrate telephonic systems with rich data systems (e.g., email applications) to increase flexibility, functionality and versatility.

Although attempts have been made to combine text communication functionality into telephonic-type devices, a substantial need exists for a system that unifies functionality of these systems thereby permitting a user to remotely access, manage and generate rich data information. Additionally, a need exists for a system and/or methodology that employs voice conversion mechanisms as well as text-to-speech technologies to unify and/or synchronize these communications systems.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention, in one aspect thereof, allows a user to connect to a server (e.g., messaging server) via a telephonic communications component thereby accessing the rich information therein. The invention comprises a system and/or methodology that unifies a telephonic communications component and/or system with a messaging server component and/or system. For example, with access to an application programming interface, the invention can add functionality to enable telephonic generation and retrieval of email communications. The invention can further facilitate accepting or canceling calendar items (e.g., meeting requests and appointments) via a telephonic communications device.

With reference to another aspect, since both the telephone client and the email client can employ the same backend information, the system can effect synchronization of an "Out of the Office" (OOF) greeting status for both systems. By way of example, today, users frequently set an OOF status on both an email system and telephone voicemail system. Because the content of an extended absence email auto-reply and a voicemail extended absence OOF greeting often contain similar information, this invention can allow users to set both the email and the voicemail OOF status at the same time from one place.

Yet another aspect is directed to a message and/or document preview system. For instance, a voicemail can be converted by a speech-to-text engine thereby generating text of the content. Thus, a user can visually see a textual rendering of the content of the original voicemail message. Other aspects are directed to employing a text-to-speech engine to convert the content of an email communication to speech thus enabling review via a telephonic communication device.

Other aspects of the invention can analyze content in a user mailbox and thereafter determine the most important messages and content in the message(s). In one example, for the important messages, an algorithm can process unread emails, consider the importance flag of the email, identify the user and corresponding organizational structure and, interrogate for key words and threads thereby returning a ranking of the message importance. For most important sentences, there can be a complex algorithm that performs pattern matching for repeated words/phrases.

In another aspect of the subject invention, calendar appointments and entries can be maintained and managed via a telephonic communications system. Today, users have limited access to their calendar from the telephone and thus, can only read limited information concerning existing appointments. With this invention, users are able to act on appointments and initiate communications related to appointments from a telephonic communications component. Users can accept, decline, and cancel appointments and requests for appointments from the telephone. Furthermore, a user telephone session with the voicemail system can automatically be transferred to a phone of the meeting location or to a participant (e.g., organizer) of the meeting. Finally, users can initiate an email message to the meeting participants (e.g., notification of a late arrival) via the telephone.

Other aspects of the invention are directed to security and digital rights management. For example, voice messages can be encoded with restrictions (e.g., do not forward, do not print, and do not save). These restrictions can be detected by the email client and subsequently be restricted in distribution and/or modification of the resultant message.

Still another aspect is directed toward security features of a unified messaging system. Spoken password voicemail authentication can be accomplished by having the user pre-record a phrase that is stored with the mailbox of that user. When the user calls via a telephone system to log on, the phrase can be repeated and then compared with the phrase on record. A confidence rating that both phrases came from the same person is computed. If the confidence rating meets predetermined criteria, access is granted.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
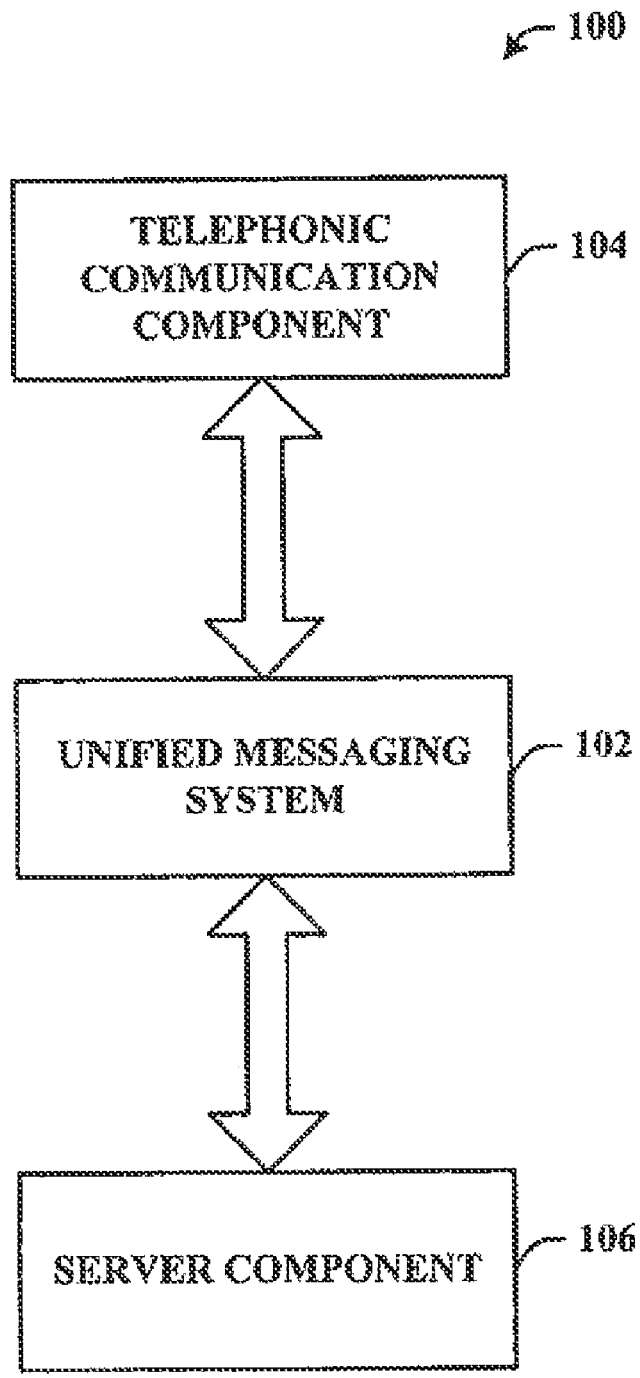
FIG. 1 illustrates a high-level exemplary system architecture that facilitates communication in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a high-level architectural diagram of a system 100 in accordance with an aspect of the subject invention. Generally, the system 100 can include a unified messaging (UM) system component 102, a telephonic communications component 104 and a computer application, state machine and/or server component 106.

The telephonic communications component 104 can include any device capable of communicating voice and/or audible sounds and signals. By way of example, the telephonic communications component 104 can include a traditional wired telephone as well as wireless (e.g., cellular) telephones. Further, the telephonic communications component 104 can be affected via a portable wireless device and/or computer that employs voice over Internet protocol (VOIP) or fax over Internet protocol (FOIP).

The server component 106 can be employed to host any communication and/or organizational application. For example, the server component 106 can host communication applications including, but not limited to, voicemail, email, text messaging applications or the like in connection with aspects of the subject invention.

In one aspect, the UM system 102 can unite the telephonic communications system 104 with the server component 106 (e.g., mailbox server). Accordingly, the telephonic communications system 104 can access the rich information maintained in the server component 106, thereby unifying the systems. Although FIG. 1 illustrates a single telephonic communications system 104 and a single server component 106, it is to be understood and appreciated that the invention is extensible thereby being capable of uniting multiple telephonic and/or server systems.

Figure 2:
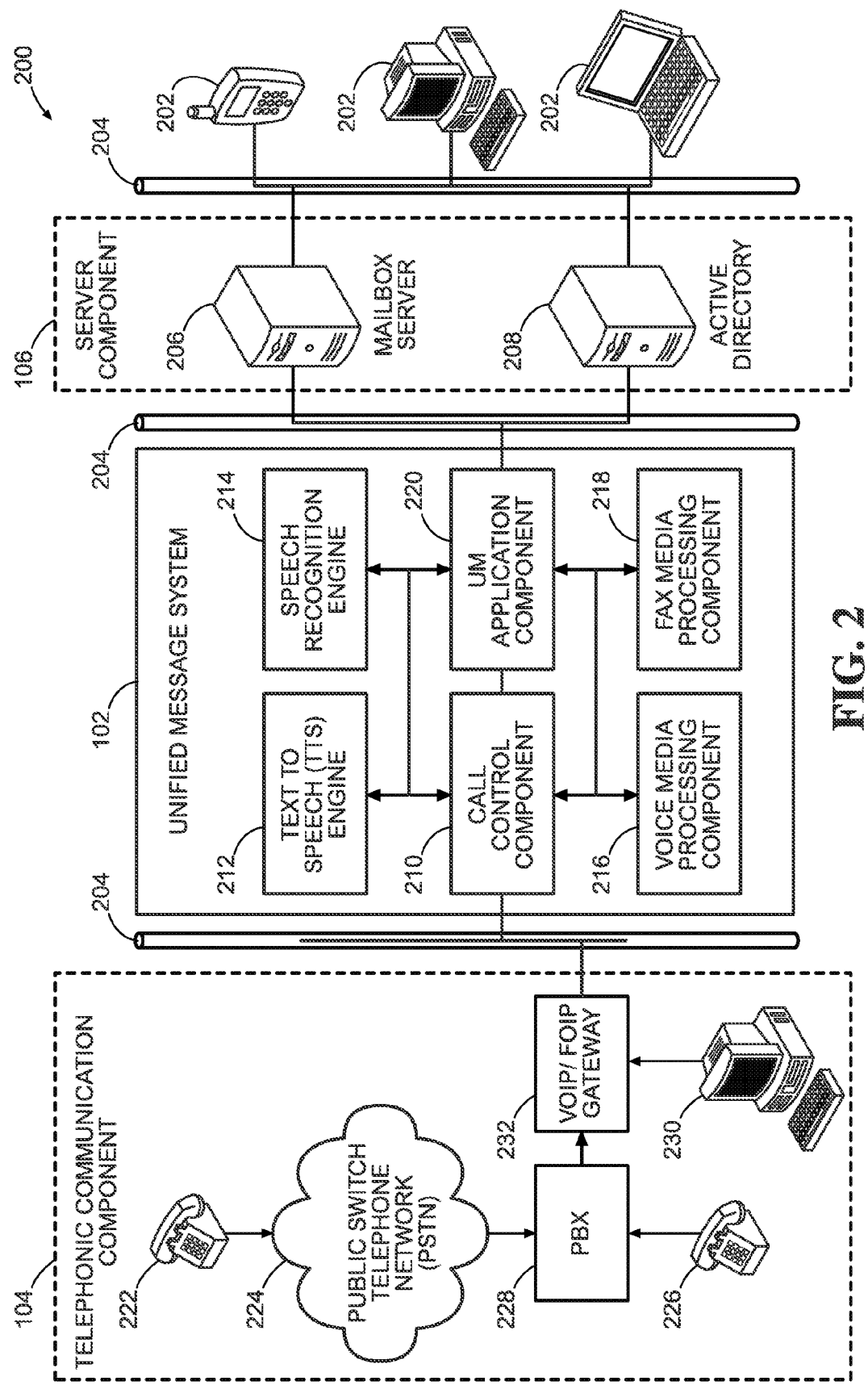
FIG. 2 illustrates an exemplary system architecture that employs a unified messaging system in accordance with a disclosed aspect.

Referring now to FIG. 2, there is illustrated an exemplary system architecture 200 in accordance with an aspect of the invention. The system 200 generally includes the UM system 102, the telephonic communications system 104 and server component 106. In one aspect, as illustrated, the telephonic communications component 104, the server component 106 and a plurality of clients 202 can be connected to the UM system 102 via a wired local area network connection 204 (e.g., Ethernet). Although three specific clients 202 (e.g., smart phone, desktop, laptop) are shown, it is to be appreciated that any number of clients 202 (e.g., email clients) can be employed without departing from the spirit and/or scope of the subject invention. It will be understood that, in alternate aspects, connections illustrated in FIG. 2 can be wired, wireless or a combination thereof.

Furthermore, it is to be appreciated that the clients 202 can employ disparate communication techniques in order to communicate with the server component 106. For example, a smart phone, pocket personal computer (PC) or other handheld device can employ specialized communications software to synchronize to a mailbox server 206 or an active directory server 208. In another example, a desktop (e.g., client 202) can employ a wired (e.g., Ethernet) connection thereby gaining access to the server component 106. Yet another exemplary client of the three clients 202 (e.g., laptop) can employ a wireless network connection to access the server component 106.

Turning now to the UM system component 102, a call control component 210, text-to-speech (TTS) engine 212, speech recognition engine 214, a voice media processing component 216, a fax media processing component 218 and a UM application component 220 can be provided. Each of these components can be better understood with reference to the exemplary scenarios infra.

The telephonic communications component 104 can include a public telephone 222 connected via a public switched telephone network (PSTN) 224, a private (e.g., in-house company) phone 226 connected via a private branch exchange (PBX) 228 or private telephone switchboard, and a computer system 230 that employs VOIP or FOIP. It will be appreciated that these components are exemplary and are not intended to be an exhaustive list of the telephonic communications component 104. In other words, telephonic communications component 104 can include any mechanism (e.g., wired, wireless, cellular telephones) capable of generating and/or transmitting audible (e.g., voice, fax) signals. The call control component 210 works with the voice media control component (e.g., 216) to share the task of handling voice communication. The call control component 210 facilitates setting up signaling and answering a call. The voice media processing component 216 actually handles the voice that then flows through the system.

Figure 3:
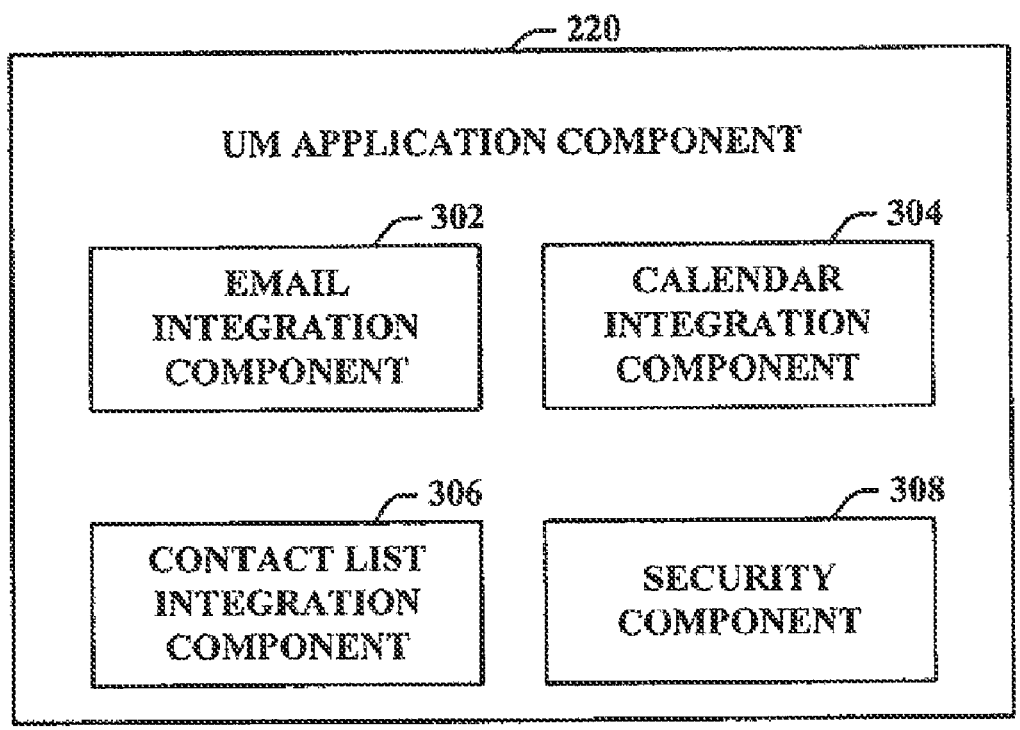
FIG. 3 is a call control component that facilitates content conversion and interpretation in accordance with a disclosed aspect.

FIG. 3 illustrates an implementation of the UM application component 220. More particularly, UM application component 220 can include an email integration component 302, a calendar integration component 304, a contact list integration component 306 and a security component 308. Each of these components (302, 304, 306, 308) will be better understood upon a discussion of the exemplary scenarios that follow. Although the UM application component 220 of FIG. 3 illustrates four exemplary functional components, it is to be appreciated that the functionality of these components described in the following scenarios can be combined (or separated) into disparate components. As well, it will be appreciated that the components described herein can be co-located or remotely located without departing from the scope of the subject invention.

In order to provide context to the invention, the following exemplary scenarios are provided. It is to be appreciated that the following scenarios are included merely to provide context to the invention. It will also be appreciated that additional scenarios exist which are not specifically disclosed herein. To this end, the scenarios infra are not intended to limit the scope and/or functionality of the subject invention.

A first exemplary scenario is directed to a discussion of the email integration component 302. More particularly, this scenario is directed to an integration of an "out-of-office" (OOF) voicemail greeting and email. With reference again to FIG. 2, conventionally, the OOF status can be separately set on both a user specific email account (e.g., via client 202) or voicemail account (e.g., via telephone 222, 226). As will be appreciated, an OOF email auto-reply generated via the server component as well as the voicemail extended absence (e.g., OOF) greeting often contain similar information. The subject invention can facilitate simultaneously setting both the email and the voicemail OOF status from a single location in a single operation.

With continued reference to FIG. 2, when a user sets the OOF status from the email application (e.g., client 202), the unified messaging system 102 can integrate (e.g., synchronize) the OOF message into the telephonic communications component 104. Accordingly, calls to the user via the telephonic communications system 104 will include an audible version of the OOF extended absence greeting. Through the use of text-to-speech conversion techniques of the TTS engine 212, this greeting can audibly render the text contained in the email OOF auto-reply.

Similarly, in the event that a user sets the OOF from the telephonic communication component 104 (e.g., telephone 222), through voice recognition techniques of the speech recognition engine 214, the unified messaging system 102 can automatically set an email OOF message in the mailbox server 206. Thereafter, a sender of an email to the user will receive a text version of the OOF auto-reply that was originated via telephonic communication mechanisms.

A second scenario is directed to the calendar integration component 304 and particularly to calendar or planner access and management. Today, users have limited access to their calendar from telephonic systems (e.g., 222, 226, 230) and can only read the information corresponding to appointments, which is maintained within server component 106. In accordance with an aspect of the subject invention, users can manage appointments and initiate communications related to appointments via the telephonic communication component 104 (e.g., telephone 222, 226, 230). It will be appreciated that full planner functionality can be facilitated via speech recognition component 214 of the unified messaging system 102. For example, via the telephonic communications device 104, a user can accept, decline, modify, cancel, and communicate with respect to appointments contained within the server component 106.

In one aspect, a telephonic session with the unified messaging system 102 can be automatically transferred to a telephone of a meeting location. In other words, via the telephonic communication component 104, a user can connect to the unified messaging system 102 whereby, based upon a calendar (e.g., appointment) entry in the server component 106, a determination can be made with respect to an appropriate transfer target location for the call. Finally, by contacting the unified messaging system 102 via any telephonic communication device 104, a user can initiate a targeted or broadcast electronic message (e.g., email) to the meeting participants. For example, a user can inform meeting participants of a delayed arrival to a meeting.

Yet another aspect is directed to remote access of contact list entries via the contact list integration component 306. In connection with systems today, users cannot telephonically access their personal contact list, which is frequently stored on the email system (e.g., server 106). In accordance with an aspect of the invention, from the telephonic communications device 104 (e.g., telephone 222, 226, 230), a user can search for contacts in the contact list maintained within the server 106. If desired, the user can immediately connect to or leave a message (e.g., voice, text, email) for the contact. If the contact is an external contact with only an email address, this invention can allow a user to communicate an audible message by creating an email with a sound file attachment (e.g., .wav) thereby forwarding the communication to the intended target.

Turning now to a discussion of the security component 308 functionality of the UM application component 220, the subject invention can be employed to reset a personal identification number (PIN) via an email or other application. By way of example, when users forget their telephone voicemail PIN (e.g., password), they frequently have to contact an information technology (IT) helpdesk or system administrator to reset it. In accordance with the UM system 102, this invention can allow a user to log into their email on the server component 106 using domain credentials and reset/change their telephone voicemail PIN (e.g., password).

Yet another scenario involving the-security component 308 is directed to digital rights management for voicemail. When leaving a voicemail today on the telephone, senders do not have any way to restrict the access to and/or management of the message. With this invention, voice messages can be sent with restricted access. For instance, a voicemail can be sent whereby a recipient can listen to the voicemail, but can be restricted from forwarding or saving the message.

Referring again to the email integration component 302, conventionally, in situations where listening to a sound file is not appropriate (e.g., in a meeting), users are unable find out the contents of their voicemail. The UM system 102 (e.g., email integration component 302) of the subject invention provides for text preview of voicemails (and vice versa). In accordance with the UM system 102, via an email client 202, users can textually access voicemails on their computer, laptop or other suitable device (e.g., smart phone). Through voice recognition techniques (e.g., speech recognition engine 214), the subject invention can convert the voicemail thereby transcribing it into text. Therefore, users can review the content of the voice message without playing the sound file. Similarly, the TTS engine 212 can be employed to convert and deliver email communications via the telephonic communications device.

Additionally, the invention can facilitate converting electronic message attachments (e.g., word processing documents) to audible files (e.g., voice). This can be accomplished via the TTS component 212. In accordance therewith, in addition to rendering the audible content of an electronic communication, the subject invention can render an audible file that contains the content of a textual attachment. It will be understood that the TTS conversion techniques and navigational concepts described herein can be applied to file system directories and the like. In other words, the speech recognition engine 214 can be employed to effect navigation within a file system directory. Accordingly, the TTS engine 212 can be employed to convert a target document to speech thus rendering the audible (e.g., voice) file to a user via the telephonic communications component 104.

Another aspect is directed to employing the email integration component 302 to facilitate analyzing the content of an email communication message. For example, when email messages are audibly rendered to a user via the telephonic communication device 104, (e.g., telephone), often the messages can be very long and difficult to follow. A novel feature of this invention employs logic and/or reasoning techniques to identify the most important messages and/or sentences (e.g., content) included in a communication. These logic and/or reasoning mechanisms can employ rule-based and/or artificial intelligence (AI) mechanisms to effect filtering and/or sorting of the content. Once identified, a streamlined or condensed version of the content can be audibly rendered to a user.

As previously described, the unified messaging system 102 can limit the audible playback of email messages to include only the most important messages and/or sentences included therein. It will be appreciated that because the content can be filtered and/or sorted in accordance with a desired algorithm (e.g., rule-based, AI), the quantity and length of the message(s) that are read to the user can be decreased. Likewise, important voicemail messages can be handled (e.g., filtered, sorted) in the same manner. Of course, when people receive many email messages over the telephone it can be difficult to navigate to the particular messages that are important to the user. With this invention, important voicemails can be identified by the UM system 102 and read to the user first. As well, voice messages can be filtered whereby only portions of the voicemails are read to the user.

Another novel feature of the subject invention is directed to facsimile transmissions. By way of example, in some organizations, all inbound facsimiles are directed to one mailbox where a router looks at the facsimile and directs it, via electronic means, to the appropriate person in the organization. If the facsimile message contains sensitive information, the person who is redirecting the facsimile would have access to information that was intended to be confidential. In accordance with an aspect of this invention, the UM system 102 can employ the fax media processing component 218 to separate the cover page from the remaining pages of a facsimile transmission. Therefore, the router who is redirecting the message can only have access to the cover page of the facsimile and not the confidential contents.

In another scenario, when people call a user and are transferred to the voicemail system, but do not leave a message, the callee does not always know that someone has called. In accordance with an aspect of this invention, the unified messaging system 102 can generate and forward an email message to the callee thereby notifying that someone has called but did not leave a voicemail message.

Still another novel aspect of the invention is directed to policy and compliance integration with an email system. Conventionally, voice messages are stored on a server (e.g., server component 106) and are retained and/or archived according to an arbitrary or preprogrammed policy. For example, one such policy can delete messages after a specific number of days (e.g., 21). With this invention (e.g., integration with the email system), a user can control which messages are deleted or archived from the telephonic communications component 104. As well, logic and/or reasoning mechanisms can be applied to automatically manage retention and/or deletion of messages.

Yet another aspect of the invention is directed to a system and/or methodology to permit a user to select a keystroke profile scheme. It will be appreciated that different voicemail systems can have different keys to navigate and control the telephone user interface. If users change from one system to another, they often have to learn the new keys to use the new system. With this invention, button profiles can be employed for the most commonly used systems. Accordingly, a user can choose a predetermined profile that is familiar to that particular user. As well, buttons can be programmed as desired by a specific user. In this manner, the user does not necessarily have to learn a new keystroke profile scheme to access a new system.

Another novel aspect of the security component 308 is directed to employing voice recognition techniques to effect voicemail authentication. Today, when users access their mailbox from the telephone, they typically key in a PIN as their password. In many cases, this is not very secure and is inconvenient to the user (e.g., accessing while driving a car). With this invention, users can audibly speak a phrase or desired PIN to gain access to their mailbox. This can be more convenient and also more secure as the voice phrase must match a previously recorded phrase by the user. As well, the system can be programmed to learn qualities (e.g., voice tonal qualities) specific to a user.

Yet another exemplary aspect is directed to end-user configuration of menus and prompts. When end-users access their mailbox via the telephone, they do not have the capability to change the buttons or the information that is played back to them during the greeting. With this invention, users can specify a location of their greeting, therefore, depending on the user role, a more detailed greeting that contains additional information may be used. For example, an IT administrator might choose to put the number of critical escalation cases in their main mailbox greeting. In alternate aspects, it is to be appreciated that prompts (e.g., audio) can be customized on a per user basis. As well, the ordering of the state machine can user customizable.

In summary, aspects of the subject invention are directed toward at least the following novel components employed in connection with the UM system 102.

OOF Voicemail Greeting Integration with Email Application—The aspect that the email and voicemail systems OOF status can be content matched thereby enabling a user to set the OOF status from one place. For example, the auto-reply email body can be read to the user as the telephone greeting using TTS mechanisms.

Calendar Access—Capability to act on and interact with calendar appointments from the telephone in a novel manner. For example, a user can accept, decline, cancel, transfer to the phone of the meeting location, and initiate an email message to the meeting participants.

Contact List Access—Capability to access personal contact list, rather than just the company directory. Ability to send, via the telephone, an email and sound file attachment to an email account.

PIN Reset—Allowing the user to reset a password (e.g., voicemail password) via an email client. It will be understood that the operating system security credentials can maintain security.

Digital Rights Management for Voicemail—Digital rights for voicemails are a new and novel concept. In other words, the invention can be employed to control and/or restrict access to voicemail content. For instance, a recipient can listen to a voicemail, but can be restricted from forwarding or saving the message.

Text Preview of Voicemails—Using speech to text conversion techniques, the subject invention can convert recorded voicemails into a textual message. The message can then be sent to the recipient via an email client application. As well, the system contemplates text to speech conversion for text messages. Moreover, the system contemplates generating and attaching a sound file (e.g., .wav format) of a voice message to an email. Thus, the email and attachment can be forwarded to the recipient.

Secure Facsimile Handling—The subject invention can extract the cover page (e.g., first page) from a received facsimile transmission thereby, retaining confidentiality of remaining pages of the transmission.

Most Importance Sentences—Based upon predefined logic and/or reasoning techniques, the invention can determine and rank sentences of a communication (e.g., email and/or voicemail) in terms of importance. For example, ranking can occur with regard to a given an email thread and key words contained therein. It will be appreciated that the ranking of sentences and/or keywords can generally provide a summary of the entire email without having to review it completely. Additionally, aspects are directed to using this technology for reading textual emails via the telephone, which is also a novel concept of the invention.

Important Messages—The fact that users can optionally apply filtering criteria (e.g., rule-based, AI) is particularly novel with respect to email messages. The subject invention can analyze email threads and rank them accordingly. By way of example, the system can determine the sender of a message, employ a policy, logic and/or reasoning mechanism thereby ranking and/or categorizing the importance of the messages. In one aspect, the system can use this technology to determine an order with respect to reading the messages to the user over the telephone. As well, this technology can be employed to filter emails prior to presenting them to a user via a telephone.

Missed Call Notification—This component can be integrated into the unified messaging system thereby providing third party call control by monitoring traffic. In one aspect, the system can monitor and advise a client of received calls. For example, the system can effect communicating a missed call notification after a predefined number of rings (e.g., 3).

Policy and Compliance Integration with Email System—novel rule-based and/or AI policies can be applied to voicemails and/or emails thereby effecting management and retention of the content.

Button Profiles—The subject invention provides for functionality that integrates novel button profile definition mechanisms.

Spoken Password Voicemail Authentication—The invention can employ a secure spoken password to access a voicemail and/or email mailbox through a telephone. This audible authentication is a novel use of the authentication technology.

End-User Configuration of Menus and Prompts—The subject invention provides for the ability to customize end-user menus and prompts.

Figure 4:
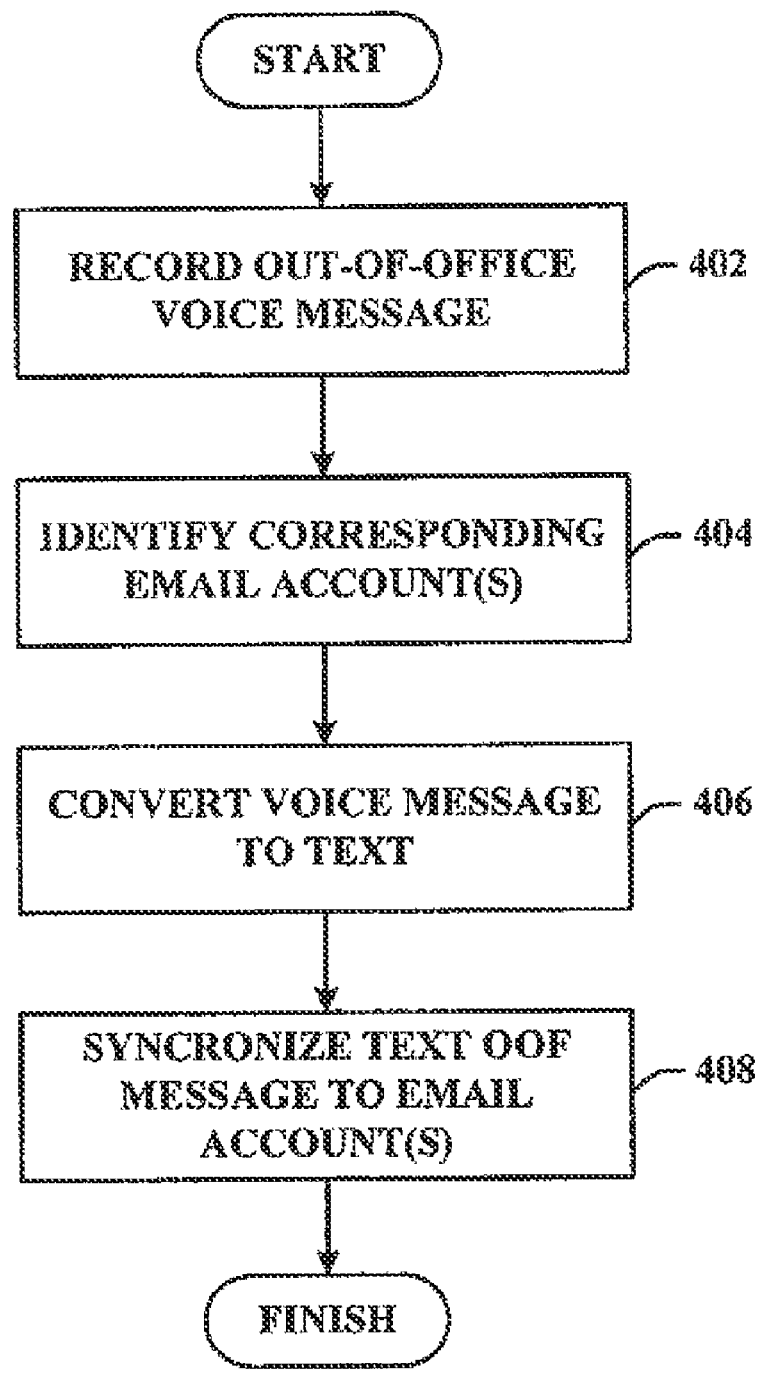
FIG. 4 illustrates a flow diagram of an exemplary communications methodology in accordance with a disclosed aspect.

FIG. 4 illustrates an exemplary flow chart of acts to employ an OOF voice message to set an email OOF notification. While, for purposes of simplicity of explanation, the one or more methodologies shown herein, e.g., in the form of a flow chart or diagram, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

At 402, an audible OOF message is recorded. The system can identify corresponding email account(s) at 404. Once identified, conversion can begin. At 406, the audible OOF message can be converted to a text OOF message. Accordingly, at 408, the text OOF message can be applied to the identified email account(s). Thus, although different format (e.g., voicemail vs. email), the content of the OOF can be replicated to the disparate system. Although the methodology of FIG. 4 illustrates a process that can convert a voicemail OOF into an email OOF, it is to be understood that an alternate novel aspect of the subject invention can be employed to convert an email OOF into a voicemail system.

As described supra, it is to be appreciated that the aforementioned novel aspects of the invention can employ rule-based logic and/or AI reasoning technology to effect, predict and/or infer an action. More particularly, it will be appreciated that the subject invention (e.g., in connection with content analysis, content retention policy, synchronization, voice recognition) can employ various rule-based and/or AI based schemes for carrying out various aspects thereof.

Figure 5:
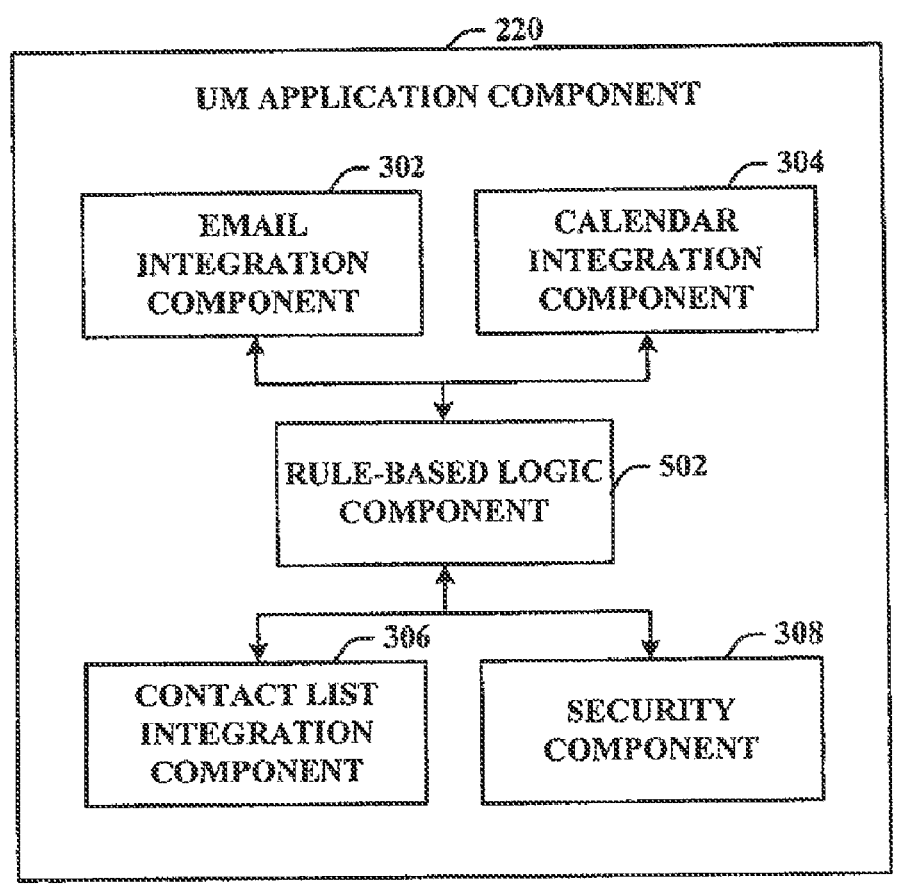
FIG. 5 illustrates a call control component that employs a rule-based logic engine in accordance with a disclosed aspect.

Continuing with the above described scenarios and with reference to FIG. 5, a block schematic view of an alternative UM application component 220 is shown. As illustrated, UM application component 220 can include a rule-based logic engine 502. As will later be described with reference to FIG. 6, an optional AI component (not shown) can be used together with, or in place of, the rule-based logic engine 502 to automatically infer an action or set of actions to be employed in connection with the functionality of the UM application component 220 (and UM system 102) described supra.

In the exemplary aspect of FIG. 5, the rule-based logic engine 502 can be programmed or configured in accordance with a predefined preference (e.g., rule). For example, a rule (e.g., logic) can be constructed to automatically prioritize emails based upon a defined hierarchy. In accordance thereto, the emails can be converted and read to a user in a prioritized order. More particularly, a rule can be established to take into consideration the subject, sender identification, recipient identification, etc. to prioritize and process emails. In another aspect, a rule can be established to predetermine or define a policy whereby emails and/or voicemails can be managed (e.g., retained, forwarded, deleted) in accordance with the policy.

Figure 6:
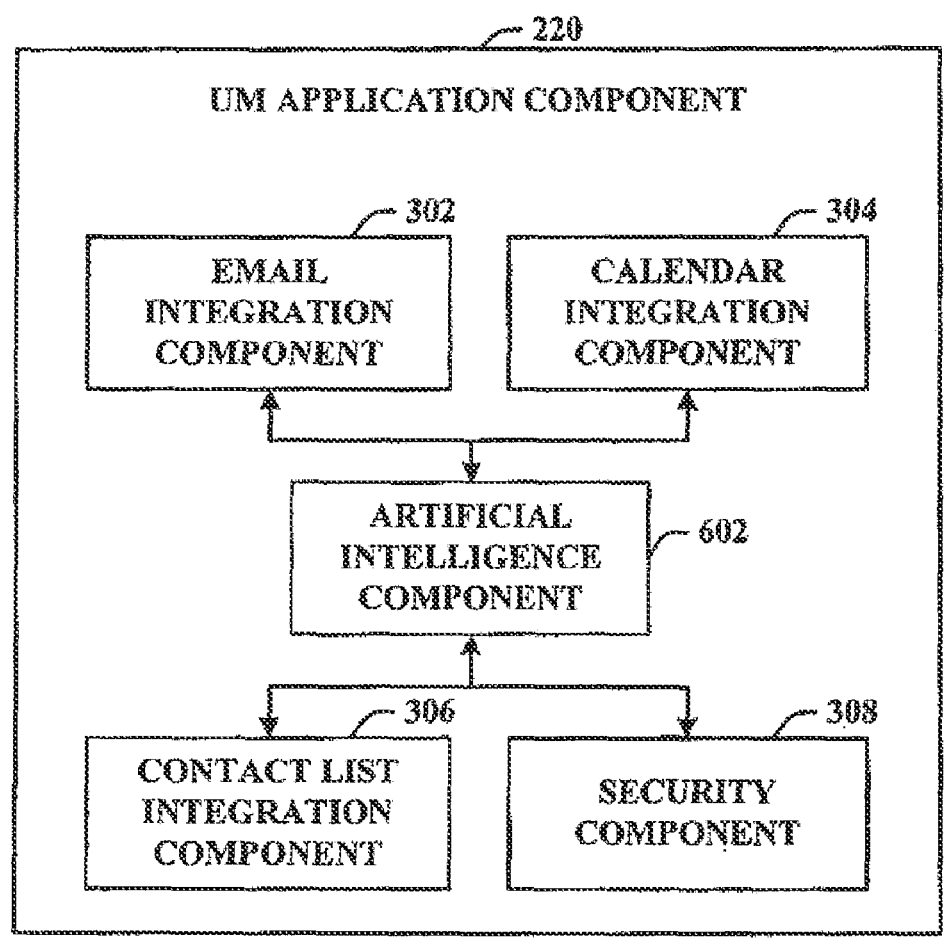
FIG. 6 illustrates a call control component that employs an artificial intelligence component in accordance with an aspect.

A schematic diagram of another alternative aspect of the subject invention is illustrated in FIG. 6. The UM application component 220 of this alternative aspect illustrated in FIG. 6 employs an optional AI component 602 that can automatically infer and/or predict an action. This alternative aspect can optionally include an inference module (not shown) that facilitates automatic control and/or operation of the UM application component 220.

In accordance with this aspect, the optional AI component 602 can facilitate automatically performing various aspects (e.g., analysis and prioritization of content, content retention policy, synchronization, voice recognition) of the subject invention as described herein. The AI component 602 can optionally include an inference component (not shown) that can further enhance automated aspects of the AI component utilizing, in part, inference based schemes to facilitate inferring intended actions to be performed at a given time and/or state. The AI-based aspects of the invention can be effected via any suitable machine-learning based technique and/or statistical-based techniques and/or probabilistic-based techniques.

In the alternate aspect, as further illustrated by FIG. 6, the subject invention (e.g., in connection with content analysis, content retention policy, synchronization, voice recognition) can optionally employ various artificial intelligence based schemes for automatically carrying out various aspects thereof. Specifically, the AI component 602 can optionally be provided to implement aspects of the subject invention based upon AI processes (e.g., confidence, inference). For example, a process for determining the prioritization of content in an email based upon user preferences or sender identification can be facilitated via an automatic classifier system and process. Further, the optional AI component 602 can be employed to facilitate an automated process of rendering prioritized content to a user based upon a predicted and/or inferred preference.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's can be configured via a learning or training phase within a classifier constructor and feature selection module. In other words, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, etc. are contemplated and are intended to fall within the scope of the hereto appended claims.

Illustrated in FIGS. 7 to 11 are flow diagrams of an exemplary user interface (UI) of a UM system in accordance with an aspect of the invention. As described supra, this UM system can facilitate management of voicemail, email and faxes stored in a server mailbox. The subject invention facilitates access to and management of this information from a telephone UI. In accordance with the UI, users are able to access their voicemail and other useful information from the telephone in lieu of accessing a desktop computer or handheld device.

Following are exemplary scenarios that this invention can address. In the first scenario, suppose a user is headed to a meeting in a remote location, but is not sure which room in the building the meeting will be held. The user may want to quickly find this information while driving his car toward the meeting. One aspect of this invention can facilitate telephonic retrieval of this information.

In another scenario, suppose a user is actually late to a meeting and desires to call into the conference room to participate over the phone before getting there. Here, the user can telephonically access the meeting location information and subsequently be transferred to the meeting location.

In a third scenario, suppose a user is driving to work in the morning and wants to get a head start on the some of the issues that are pending in emails or voicemails. From the telephone UI, the user can quickly review the different issues, reply as desired, and follow-up with the people involved with the issues.

In a final exemplary scenario, suppose a user is in a hotel room without access to a printer and wishes to send emails as well as calendar appointments for the following day to the hotel fax so that the user can review materials and plan the day. One aspect of the invention facilitates this functionality via a telephonic connection. The procedure flow of these and other aspects will be better understood upon a review of FIGS. 7 to 11 that follow.

Figure 7A:
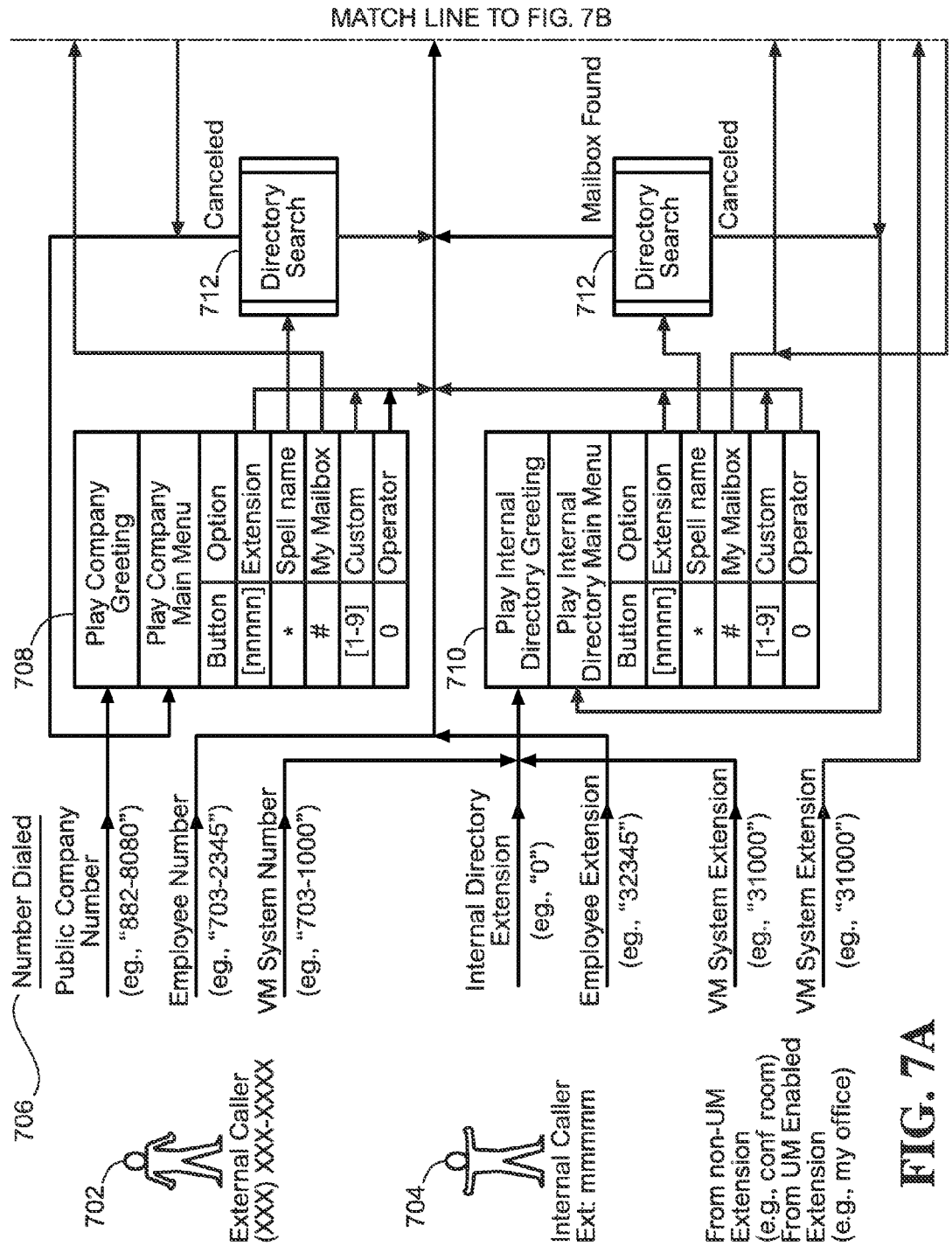
FIGS. 7A and 7B reflect an exemplary flow diagram of calling into a unified messaging system in accordance with a disclosed aspect.
Figure 7B:
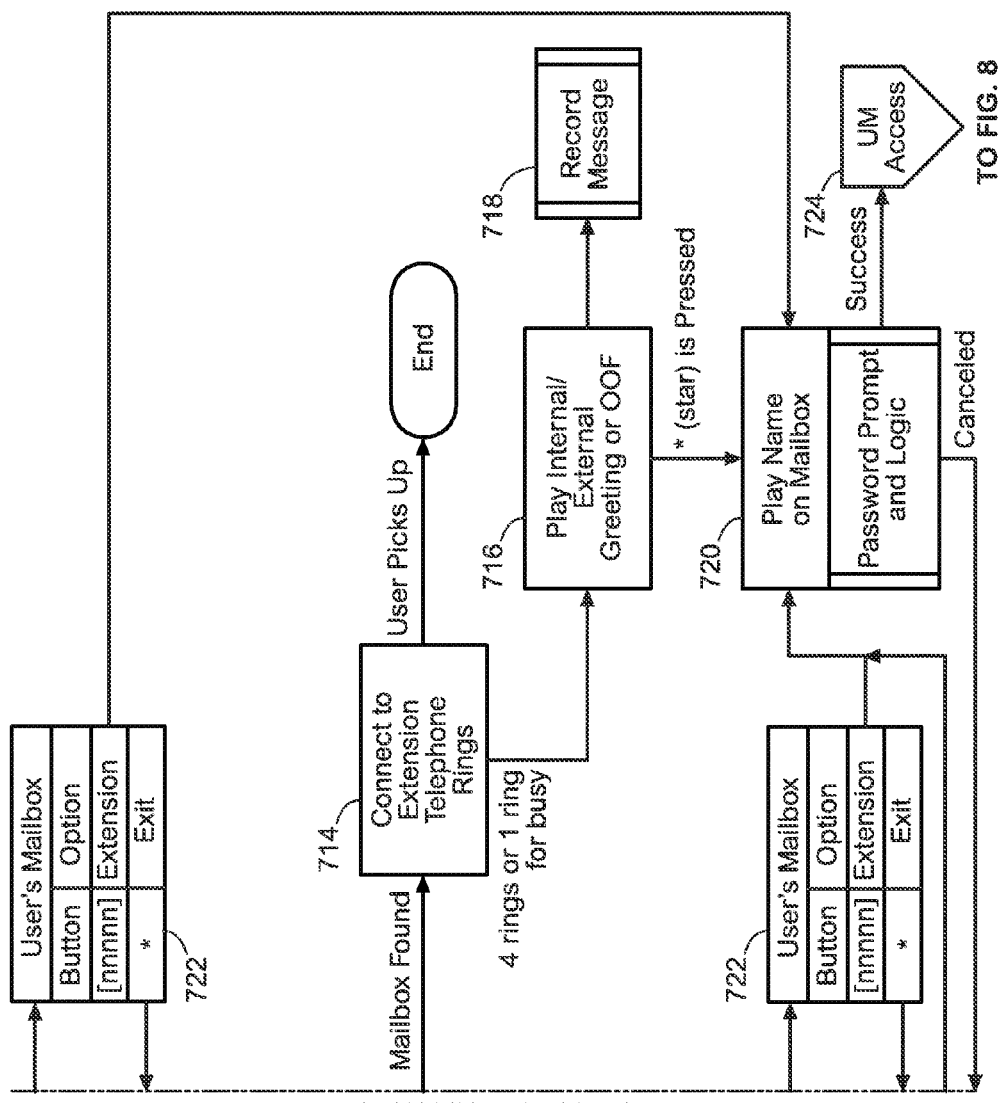

Referring now to FIG. 7, an exemplary process task flow diagram of calling into a UM is shown. The process illustrates a flow of procedures in accordance to a call initiated by an external caller 702 and an internal caller 704. As illustrated, the process flow of the exemplary aspect is dependent upon the type of caller (e.g., external 702 or internal 704) as well as the contact number dialed at 706. An external caller will be prompted with the company information at 708 whereby an internal caller with internal information at 710.

In each scenario, a caller can contact a user located on the system by spelling the name and employing the directory search at 712 or by connecting directly to the extension (714) by entering the numeric extension. If the user does not answer, at 716, the system can play the appropriate greeting (e.g., external, internal, OOF) in accordance with the type of caller. Accordingly, a voicemail message can be recorded at 718. If a pre-designated key (e.g., "*") is pressed, the system can enter the callee mailbox at 720.

Figure 8A:
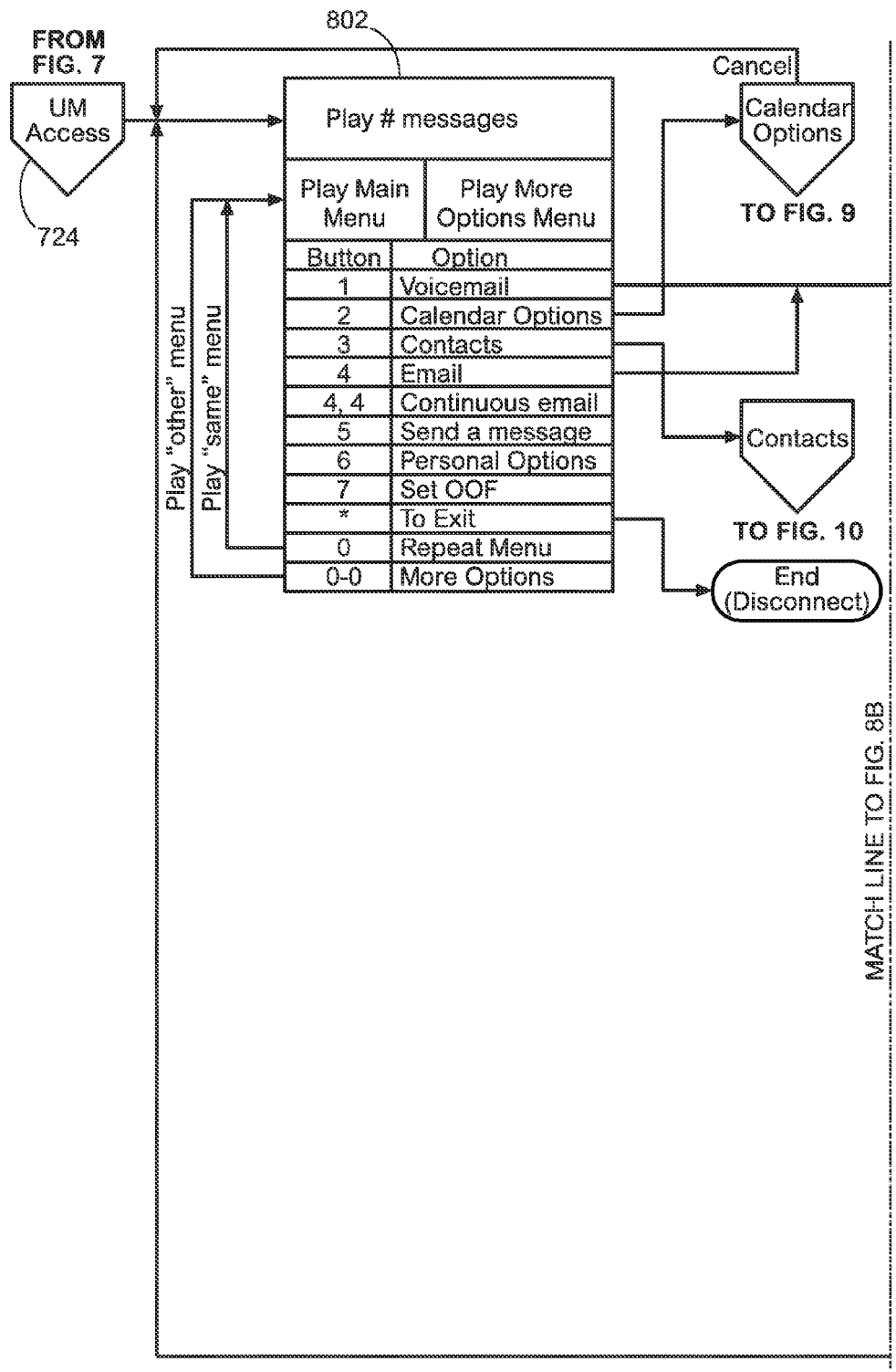
FIGS. 8A, 8B, and 8C reflect an exemplary flow diagram of accessing voicemail and email in accordance with the invention.
Figure 8B:
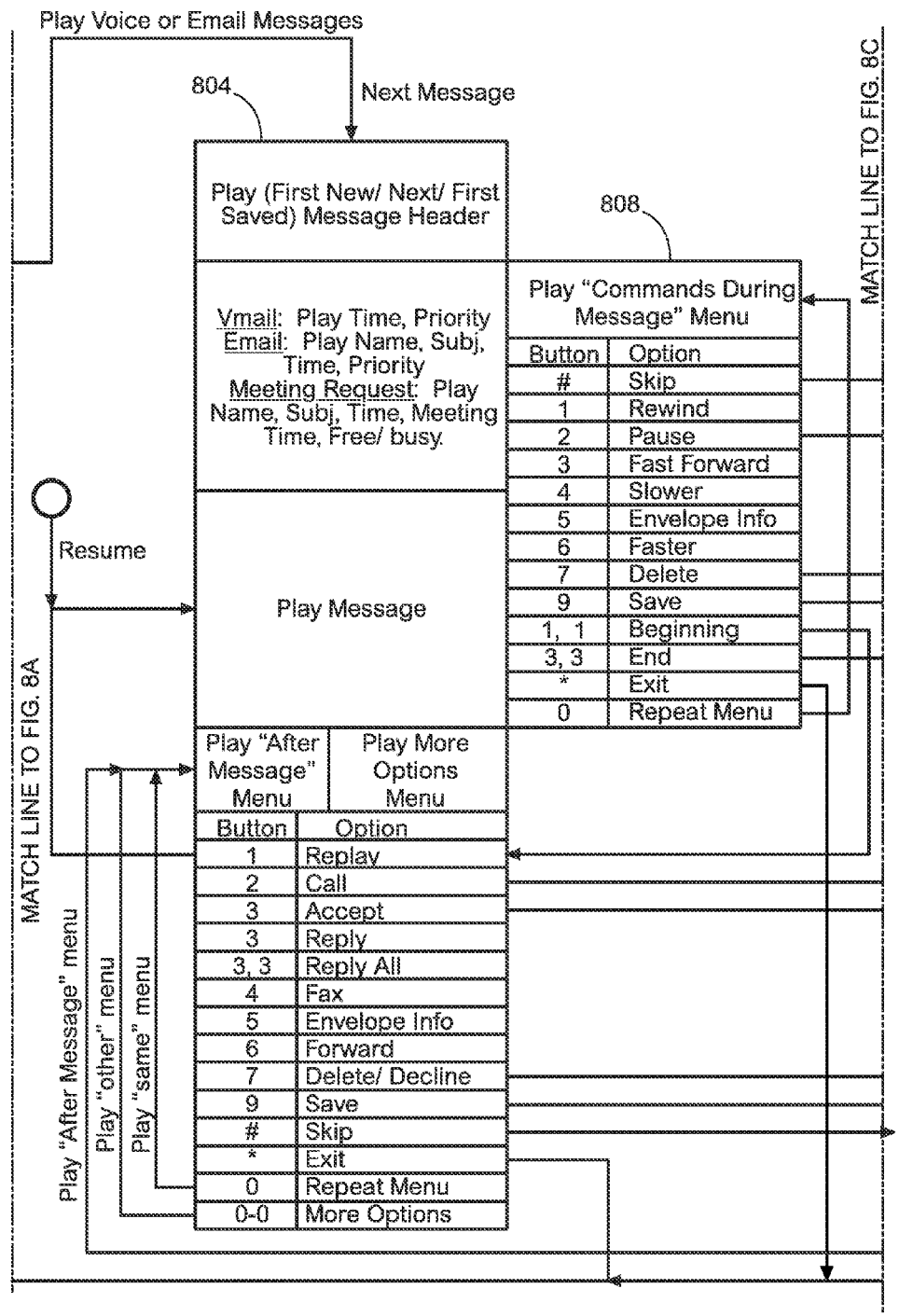
Figure 8C:
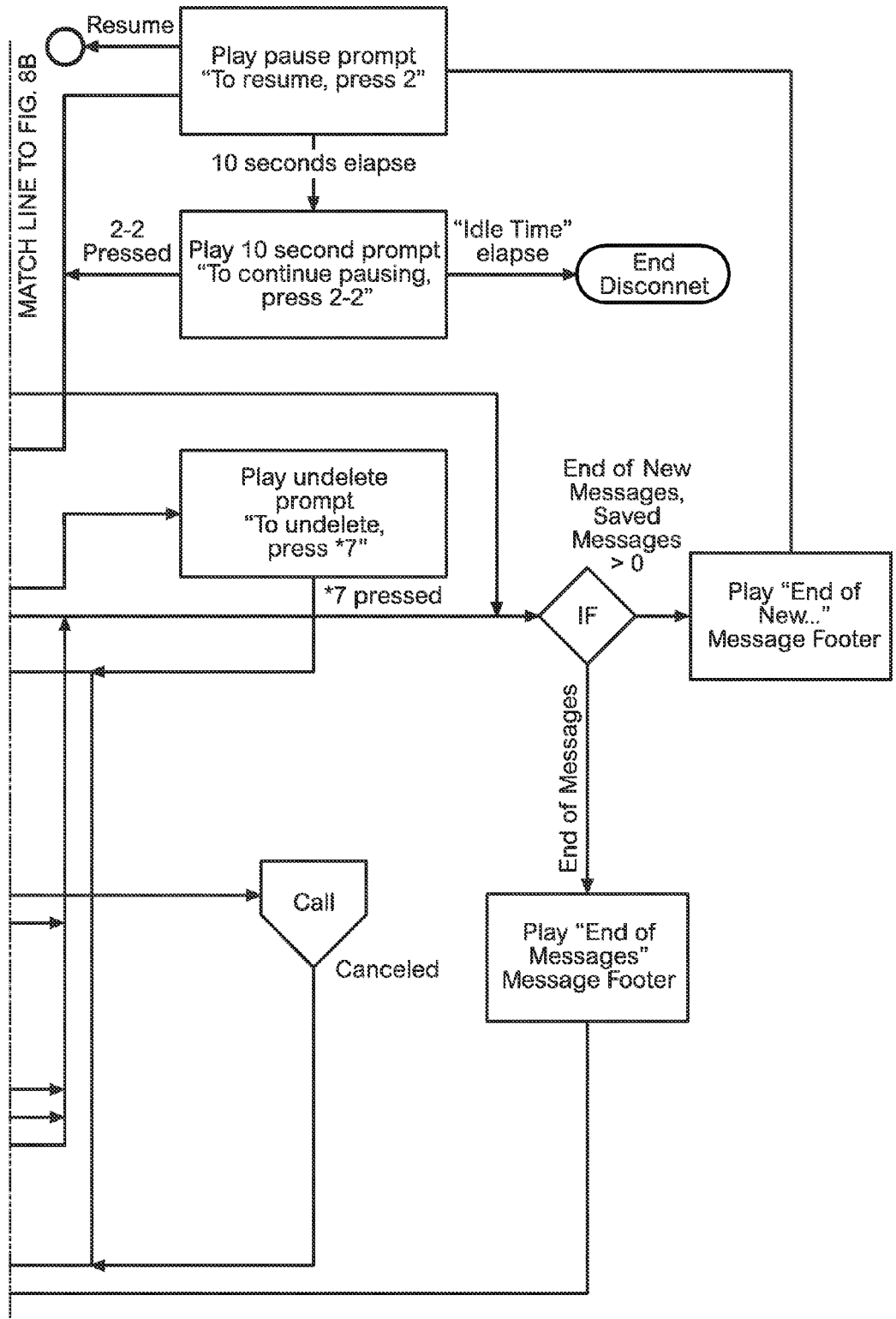

It is to be appreciated that the callee can access the mailbox directly from 720 by choosing a pre-designated key (e.g., "#") from the company and/or internal greeting menu (708, 710). This direct access will prompt the callee for necessary information at 722. In each case, once the appropriate security credential information is entered at 720, access to the UM is gained at 724. FIG. 8 illustrates a continued procedure flow diagram once access is granted.

Referring now to FIG. 8, once access to the UM is granted at 724, the user can be prompted with a main menu at 802. By way of example, the user can be prompted to press "1" for voicemail, "2" for calendar options, "3" for contacts, "4" for email and so on. Option numbers "2" and "3", e.g., calendar options and contacts, will be discussed in greater detail with reference to FIGS. 9 and 10 respectfully. By way of further example, a user can choose "5" to send a message (e.g., voicemail, email) or "7" to set an OOF. Additional exemplary menu choices are illustrated in block 802.

As shown, if voicemail or email is chosen the system proceeds to 804 whereby content can be presented to the user. In other words, the user can be presented with voicemail, email and/or meeting request content. It is to be appreciated that logic and reasoning mechanisms can be employed to manage, organize, filter and/or sort the content as described supra. As illustrated, once the content is presented, the user can be presented with an "after message" menu thereby presenting additional options. By way of example, by pressing "4" a user can send a facsimile of a desired message. In other words, once a user listens to a voicemail and/or TTS converted email, the user can opt to send a facsimile of the message to a desired location. As well, by pressing "3", the user can reply to the message or accept a meeting appointment request. By choosing option "2", a user can call the sender of a particular message at 806. This "call" option will be discussed in greater detail with reference to FIG. 10. It is to be appreciated that the options shown in the UI process flow of FIG. 8 are exemplary and are not intended to be an exhaustive list of options available to a user.

At 808, a list of exemplary play commands, which are presented during playback of a message, are shown. Again, this list is not intended to be exhaustive in view of the functionality described herein. As illustrated, it will be appreciated that the system can affect a pause, undelete, repeat, etc. task in accordance with options shown at 808.

Figure 9A:
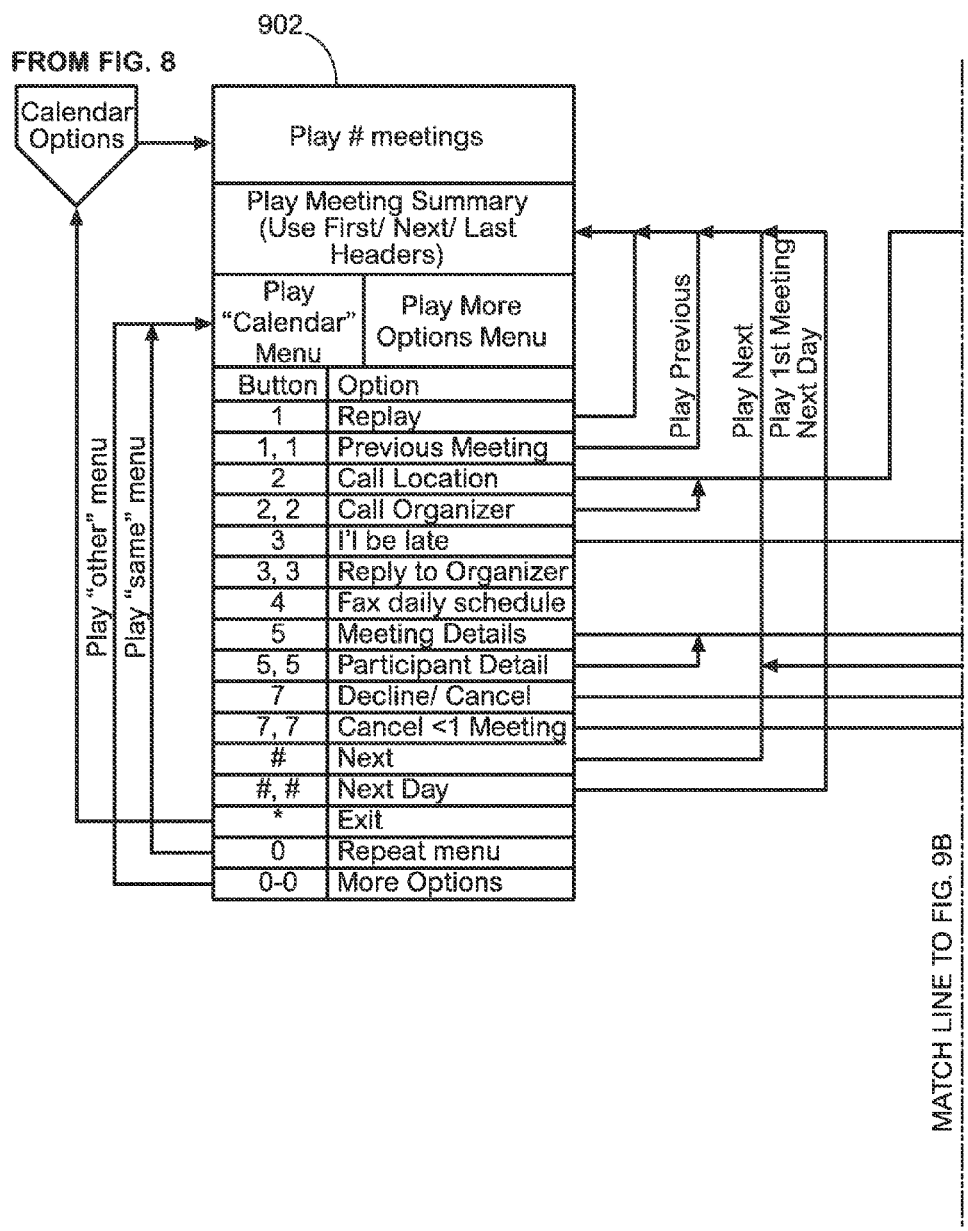
FIGS. 9A, and 9B reflect an exemplary flow diagram of accessing an electronic calendar in accordance with an aspect of the invention.
Figure 9B:
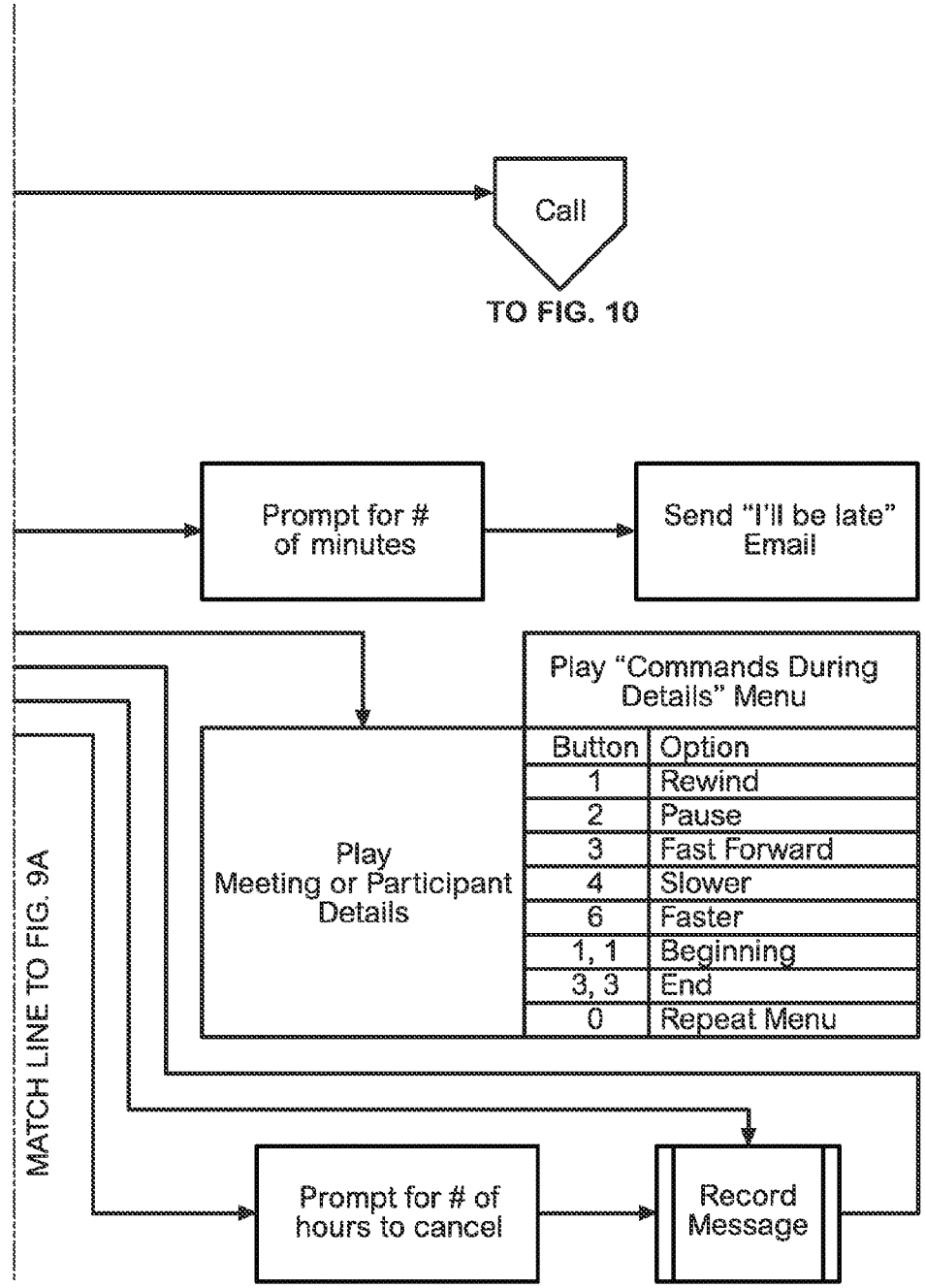

Turning now to FIG. 9, an exemplary flow diagram of calendar access is shown. At 902, the system can play the number of pending meetings. As well, as illustrated at 902, the user can manage the meeting appointments and/or requests by selecting any of various options. For example, the user can select option "2" to call the meeting location, "2,2" to call the meeting organizer or "3" to indicate a late arrival to the subject meeting. As well, additional navigational options can be presented to the user as illustrated.

Figure 10:
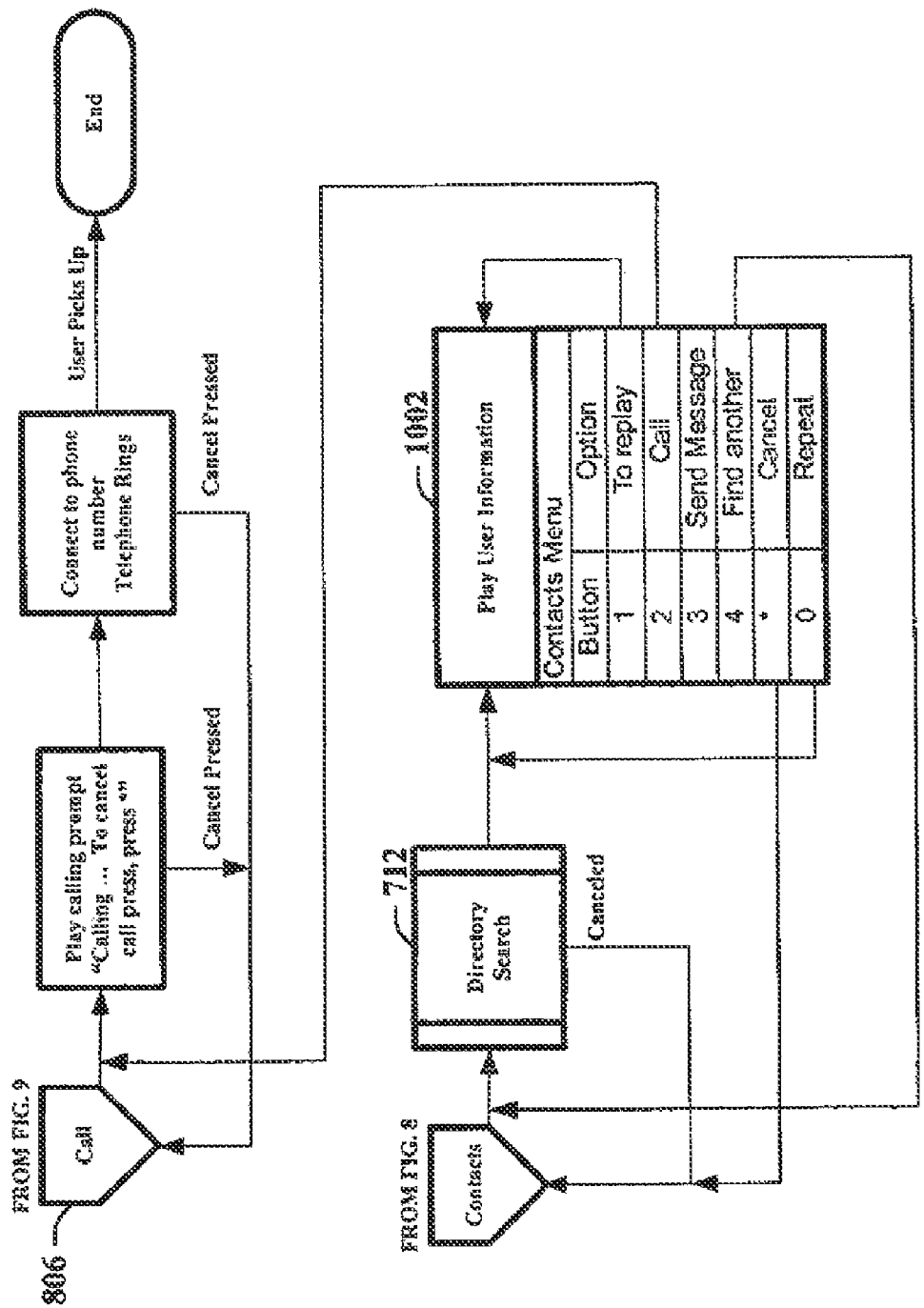
FIG. 10 is an exemplary flow diagram of accessing electronic contacts in accordance with a disclosed aspect.

FIG. 10 illustrates an exemplary process flow to effect generating a call from the contacts menu. It is to be appreciated that a call can also be generated in accordance with a meeting request/appointment or a received communication. Referring again to FIG. 10, once a contact is located via the directory search at 712, the system can present user information at 1002. The information presented at 1002 can affect any desired task. By way of example, the user can call or send a message to the contact by pressing "2" or "3" respectively. If the user chooses to call, the process continues to generate the call as illustrated.

Figure 11:
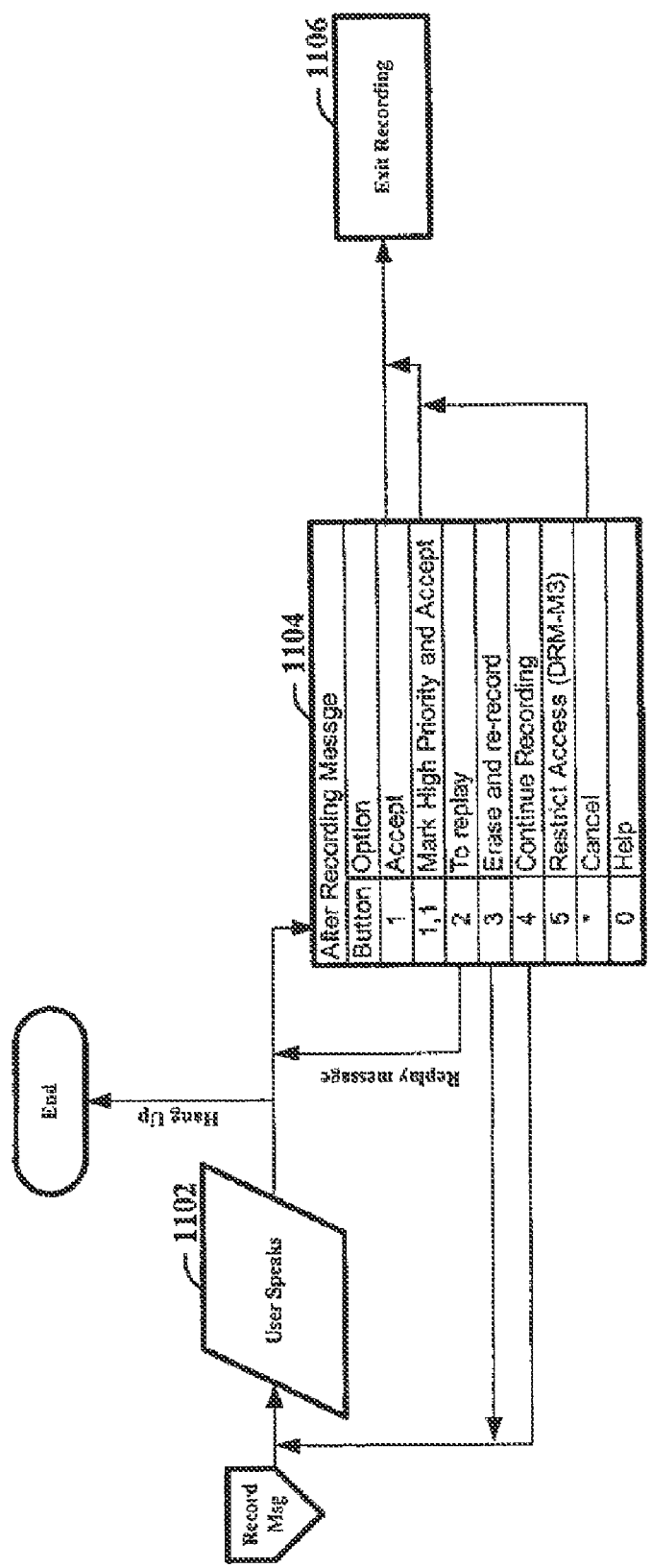
FIG. 11 is an exemplary flow diagram of recording a message in accordance with a disclosed aspect.

Illustrated in FIG. 11 is a process flow diagram to record a message. The message is recorded at 1102. At 1104, the user is presented with a variety of options to manage the recording. For example, the user can mark the message with high priority by depressing "1,1" or restrict access by depressing "5". Once complete, the user can exit the system at 1106.

Figure 12:
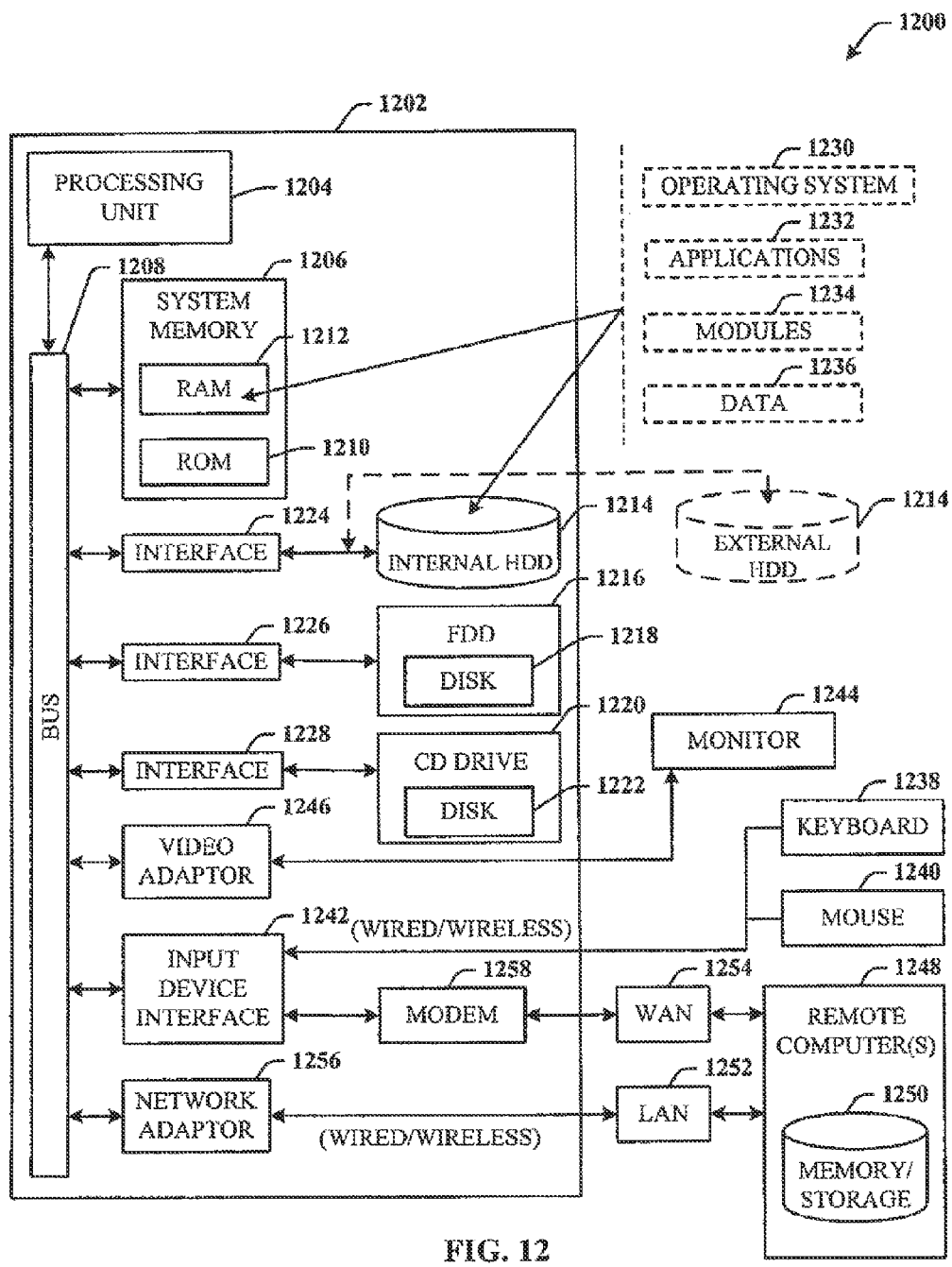
FIG. 12 illustrates a block diagram of a computer that can execute the disclosed architecture.

Referring now to FIG. 12, there is illustrated a block diagram of a computer operable to execute the disclosed architecture. In order to provide additional context for various aspects of the subject invention, FIG. 12 and the following discussion are intended to provide a brief, general description of a suitable computing environment 1200 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, there is illustrated an exemplary environment 1200 for implementing various aspects of the invention that includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the subject invention can be implemented with various commercially available operating systems or combinations of operating systems.

A user can enter commands and information into the computer 1202 through one or more wired/wireless input devices; e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256. When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
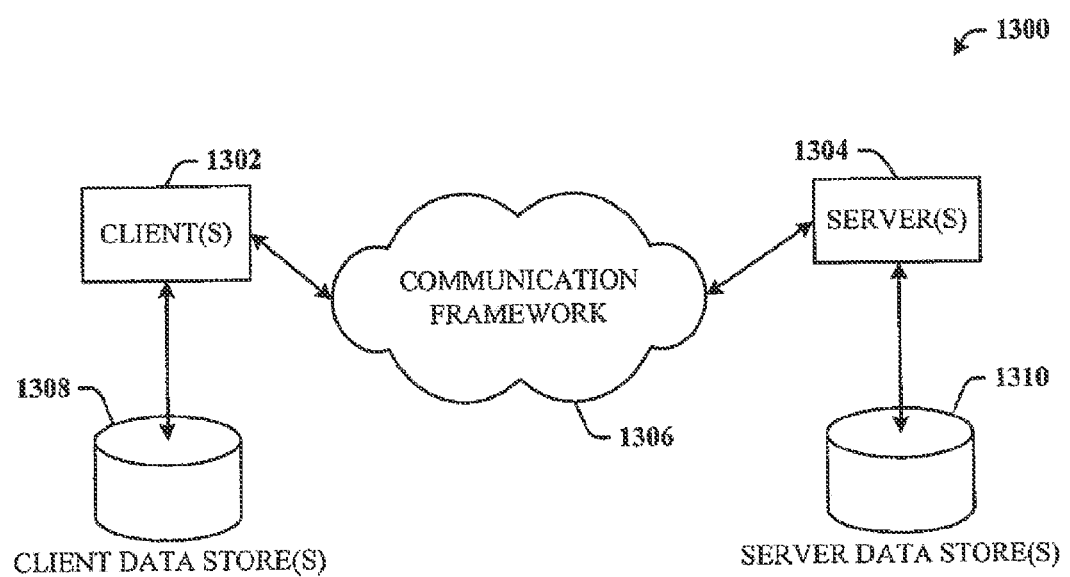
FIG. 13 illustrates a schematic block diagram of an exemplary computing environment in accordance with the subject invention.

Referring now to FIG. 13, there is illustrated a schematic block diagram of an exemplary computing environment 1300 in accordance with the subject invention. The system 1300 includes one or more client(s) 1302. The client(s) 1302 can be hardware and/or software (e.g., threads, processes, computing devices). The client(s) 1302 can house cookie(s) and/or associated contextual information by employing the subject invention, for example. The system 1300 also includes one or more server(s) 1304. The server(s) 1304 can also be hardware and/or software (e.g., threads, processes, computing devices). The servers 1304 can house threads to perform transformations by employing the subject invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for rendering communications, the method comprising:

receiving a message in a first media format; and converting, by a system, the message to a second media format that conveys the message, wherein the message in the first media format has a restricted access that prevents the message from being forwarded, wherein converting the message maintains the restricted access such that the message is prevented from being forwarded in the second media format, the message comprising multipages comprising a first page and remaining pages, wherein converting to the second media format comprises converting the first page separately from the remaining pages, the first page not having the restricted access, the remaining pages being restricted to have access by only a recipient specified in the multipages.

2. The method of claim 1, wherein receiving the message comprises receiving the message wherein the received message comprising a fax.

3. The method of claim 1, wherein receiving the message comprises receiving the message wherein the received message comprises a voicemail.

4. The method of claim 1, wherein receiving the message comprises receiving the message from a first device.

5. The method of claim 1, wherein receiving the message comprises receiving the message from a voice over internet protocol (VOIP) gateway.

6. The method of claim 1, wherein receiving the message comprises:

receiving the message from a publicly switched telephone network (PSTN);

transmitting the message from the PSTN to a voice over internet protocol (VOIP) gateway; and receiving the message from a VOIP gateway.

7. The method of claim 1, wherein converting the message comprises converting the message wherein the converted message comprising an e-mail.

8. The method of claim 1, wherein converting the message comprises converting the message wherein the received message and the converted message are date and time synchronized.

9. The method of claim 1, wherein converting the message comprises converting the message wherein the received message and the converted message are date synchronized.

10. The method of claim 1, wherein converting the message comprises converting the message wherein the received message and the converted message are time synchronized.

11. The method of claim 1, wherein converting the message to the second media format comprises converting the message to the second media format that corresponds to a target device.

12. A computer-readable medium that stores a set of instructions which when executed perform a method for rendering communications, the method executed by the set of instructions comprising:

receiving a message of a first media format; and converting the message to a second media format that conveys the message, wherein the message in the first media format has a restricted access that prevents the message from being forwarded, wherein converting the message maintains the restricted access such that the message is prevented from being forwarded in the second media format, the message comprising multipages comprising a first page and remaining pages, wherein converting to the second media format comprises converting the first page separately from the remaining pages, the first page not having the restricted access, the remaining pages being restricted to have access by only a recipient specified in the multipages.

13. The computer-readable medium of claim 12, wherein receiving the message comprises receiving the message wherein the received message comprising a fax.

14. The computer-readable medium of claim 12, wherein receiving the message comprises receiving the message wherein the received message comprises a voicemail.

15. The computer-readable medium of claim 12, wherein receiving the message comprises receiving the message from a first device.

16. The computer-readable medium of claim 12, wherein converting the message comprises converting the message wherein the converted message comprising an e-mail.

17. The computer-readable medium of claim 12, wherein converting the message comprises converting the message wherein the received message and the converted message are synchronized.

18. The computer-readable medium of claim 12, wherein converting the message comprises converting the message wherein the received message and the converted message are date and time synchronized.

19. The computer-readable medium of claim 12, wherein converting the message to the second media format comprises converting the message to the second media format that corresponds to a target device.

20. A system for rendering communications, the system comprising:
   a memory storage; and
   a processing unit coupled to the memory storage, wherein the processing unit is operative to convert a message of a first media format to a second media format that conveys the message, wherein the message in the first media format has a restricted access that prevents the message from being forwarded, the conversion maintains the restricted access such that the message is prevented from being forwarded in the second media format, the message comprising multipages comprising a first page and remaining pages, conversion to the second media format converts the first page separately from the remaining pages, the first page not having the restricted access, the remaining pages being restricted to have access by only a recipient specified in the multipages.

* * * * *